United States Patent
Zhang et al.

(10) Patent No.: US 9,710,042 B2
(45) Date of Patent: Jul. 18, 2017

(54) ADAPTIVE MICROPROCESSOR POWER RAMP CONTROL

(71) Applicant: Oracle International Corporation, Redwood City, CA (US)

(72) Inventors: Haowei Zhang, Santa Clara, CA (US); Xiaoying Shen, Austin, TX (US); Sebastian Turullols, Los Altos, CA (US); Robert T. Golla, Round Rock, TX (US)

(73) Assignee: Oracle International Corporation, Redwood City, CA (US)

( * ) Notice: Subject to any disclaimer, the term of this patent is extended or adjusted under 35 U.S.C. 154(b) by 179 days.

(21) Appl. No.: 14/461,042

(22) Filed: Aug. 15, 2014

(65) Prior Publication Data

US 2016/0048187 A1 Feb. 18, 2016

(51) Int. Cl.
*G06F 1/30* (2006.01)
*G06F 1/32* (2006.01)
*G06F 9/38* (2006.01)

(52) U.S. Cl.
CPC .......... *G06F 1/3206* (2013.01); *G06F 9/3869* (2013.01); *G06F 1/3287* (2013.01); *Y02B 60/1282* (2013.01)

(58) Field of Classification Search
CPC ..... G06F 1/3206; G06F 1/3287; G06F 9/3869
See application file for complete search history.

(56) References Cited

U.S. PATENT DOCUMENTS

| | | | | |
|---|---|---|---|---|
| 2009/0063884 A1* | 3/2009 | Weekly | ............... | G06F 1/3203 713/340 |
| 2012/0249110 A1* | 10/2012 | Mohr | ................... | H02M 3/156 323/299 |
| 2014/0325159 A1* | 10/2014 | Meredith | ........... | G06F 12/0862 711/135 |
| 2015/0378412 A1* | 12/2015 | Suryanarayanan | ....... | G06F 1/28 713/340 |

* cited by examiner

*Primary Examiner* — Thomas Lee
*Assistant Examiner* — Vincent Chang
(74) *Attorney, Agent, or Firm* — Marsh fischmann & Breyfogle LLP; Daniel J. Sherwinter

(57) ABSTRACT

Embodiments of the invention provide adaptive power ramp control (APRC) in microprocessors. One implementation of the APRC can compute a present core power and a present power ramp condition in the microprocessor, for example, to determine whether the present power is in a particular predefined control zone and whether the present power ramp is greater than a predefined threshold for that control zone. Those determinations can indicate a likelihood of an imminent, undesirable power ramp condition and can inform entry into a control mode. The APRC can generate an appropriate stall control signal in response to its present control mode, and the stall control signal can stall operation of at least one functional unit of the microprocessor according to a predefined stall pattern. This can effectively combat the imminent power ramp condition by reducing the power usage of the microprocessor.

20 Claims, 9 Drawing Sheets

ADAPTIVE MICROPROCESSOR POWER RAMP CONTROL

BACKGROUND

Embodiments relate generally to microprocessors, and, more particularly, to adaptive power ramp control in microprocessors.

High-frequency voltage droop, sometimes called "LdI/dt" droop, can manifest in microprocessors (e.g., and other very-large-scale integration (VLSI) circuits, and the like), because of effects of inductance (L) in power distribution networks (PDN) of the circuits, combined with sudden power and/or current fluctuations (dI/dt). For example, some state-of-the-art microprocessors have been shown to experience voltage droops of around 80 mV within a few nanoseconds. This phenomenon can be found in high-performance microprocessors and also in lower-power embedded processors (e.g. mobile platforms, such as smart phones, tablet computers, etc.), which can include economic packages having relatively large inductances. As microprocessor complexities increase, both dI/dt and L tend to increase from one generation to another, which can manifest increasingly severe high-frequency voltage droops.

Such voltage droops can affect circuit timing, including potentially causing critical path timing failures. Some traditional approaches seek to avoid critical path timing failures during LdI/dt voltage droop by designing microprocessors with large operational margins (e.g., voltage guardbands), for example, as part of a voltage regulator module (VRM). Increasing operational margins often involves sacrificing power and performance. Other traditional approaches seek to suppress voltage fluctuations, which can allow the microprocessors to perform reliably with a smaller voltage guardband, thereby permitting use of lower VRM supply voltages to save power and/or permitting boosting to higher frequencies to improve performance. Both reduced power and increased performance are considered important metrics in microprocessors design. However, such traditional approaches tend to be of little effect or are effective only in limited frequency ranges.

BRIEF SUMMARY

Among other things, systems and methods are described for providing adaptive power ramp control in microprocessors. Some embodiments operate in context of an adaptive power ramp control (APRC) circuit implement on-board of a microprocessor (or other suitable circuit environment). In one implementation, the APRC can compute a present core power and a present power ramp condition in the microprocessor. For example, an average core instantaneous power can be calculated to determine whether the present power is in a particular predefined control zone, and an average power ramp slope can be calculated to determine whether the present power ramp is greater than a predefined threshold for that control zone. Those determinations can indicate a likelihood of an imminent, undesirable power ramp condition, such as a fast increase in power and a resulting voltage droop. The determinations can inform entry into a control mode (or exit from a control mode, transition between control modes, etc.). Each control mode can be associated with a stall control signal, so that determining to be in a particular control mode can drive generation of its associated stall control signal, and the stall control signal can stall operation of at least one functional unit of the microprocessor according to a predefined stall pattern. This can effectively combat the imminent power ramp condition by reducing the power usage of the microprocessor.

According to one set of embodiments, a system is provided for adaptive self-control of microprocessor power. The system includes: a power monitor subsystem disposed to compute a present core power and a present power ramp condition in the microprocessor; a trigger monitor subsystem disposed to determine a control mode corresponding to a likelihood of an imminent power ramp event according to the present core power and the present power ramp condition; and a stall control subsystem disposed to generate a stall control signal as a function of the control mode, the stall control signal operable to stall operation of at least one functional unit of the microprocessor according to a predefined stall pattern.

According to another set of embodiments, a method is provided for adaptive self-control of microprocessor power. The method includes: computing a present core power and a present power ramp condition in the microprocessor; determining a control mode corresponding to a likelihood of an imminent power ramp event according to the present core power and the present power ramp condition; and generating a stall control signal as a function of the control mode, the stall control signal operable to stall operation of at least one functional unit of the microprocessor according to a predefined stall pattern.

According to a third set of embodiments, a microprocessor is provided having adaptive power ramp control. The microprocessor includes a number of functional units and an adaptive power ramp controller circuit in communication with at least some of the functional units. The adaptive power ramp controller circuit includes: a power monitor sub-circuit disposed to compute a present core power and a present power ramp condition in the microprocessor; a trigger monitor sub-circuit disposed to determine a control mode corresponding to a likelihood of an imminent power ramp event according to the present core power and the present power ramp condition; a stall control sub-circuit disposed to generate a stall control signal as a function of the control mode, the stall control signal operable to stall operation of at least one functional unit of the microprocessor according to a predefined stall pattern; and a finite state machine sub-circuit disposed to monitor a present state of the microprocessor and to direct operation of the power monitor sub-circuit, the trigger monitor sub-circuit, and the stall control sub-circuit according to the detected present state of the microprocessor.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention. Further, while many embodiments are described in context of a "microprocessor," such embodiments are intended to be broadly applicable to any similar circuit context, for example, including VLSI circuits, relatively high-performance controllers, relatively high-inductance embedded controllers, etc.

Embodiments provide techniques for enabling microprocessors to adaptively control their behaviors, including actively mitigating power and/or voltage fluctuations. For example, embodiments can monitor the likelihood of an imminent power ramp (i.e., one that is about to happen, but has not happened yet) and can provide an efficient control scheme to suppress the power ramp before it can cause appreciable voltage droop. For example, such monitoring and control functionality can be implemented in a programmable hardware controller of a microprocessor (e.g., or in each core of a multi-core processor to provide distributed control). Limiting dI/dt can limit voltage fluctuations in the microprocessor, which can permit an appreciably reduced voltage guardband and can improve energy efficiency and/or other performance aspects of a microprocessor.

Figure 1B:
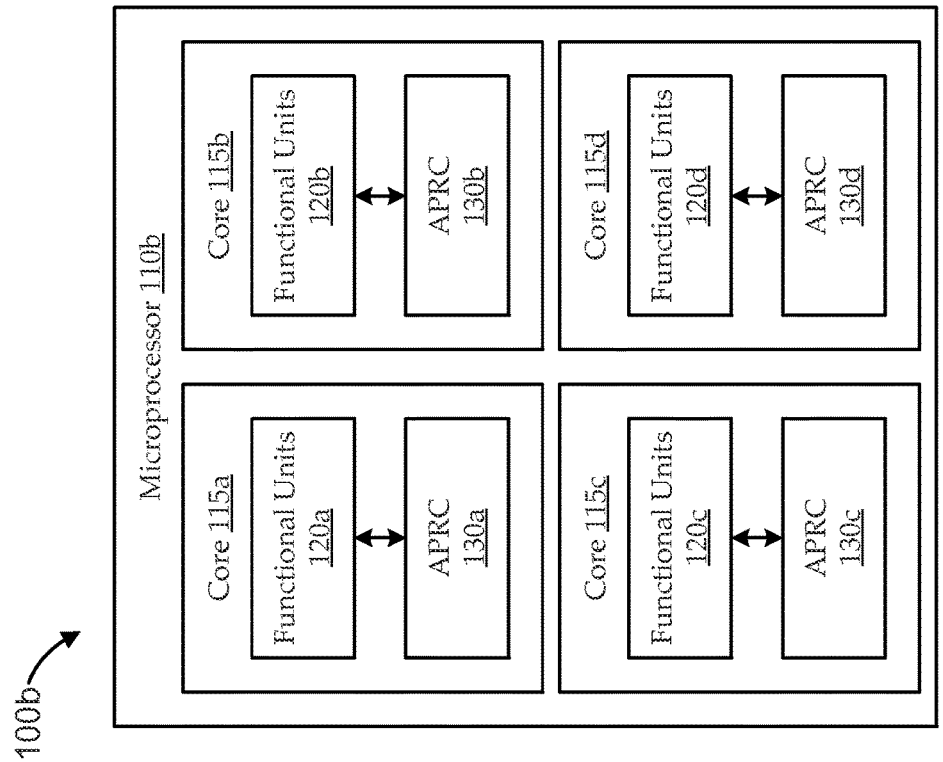
FIGS. 1A and 1B show simplified functional block diagrams of illustrative microprocessor implementations, which provide a context for various embodiments.
Figure 1A:
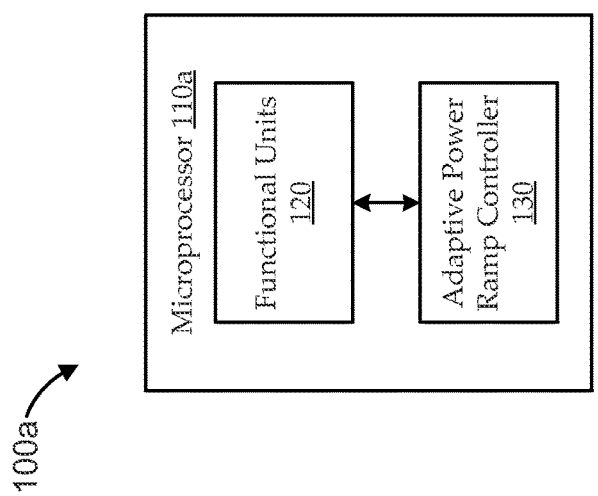

Turning first to FIGS. 1A and 1B, simplified functional block diagrams are shown of illustrative microprocessor implementations 100, which provide a context for various embodiments. The microprocessor 110*a* shown FIG. 1A includes an adaptive power ramp controller (APRC) 130 in communication with functional units 120 of the microprocessor 110*a*. For example, the functional units 120 can include a load store unit (LSU), instruction fetch unit (IFU), instruction set simulator (ISS), execution unit (EXU), instruction decode unit (IDU), instruction cache, bus cycle control unit (BCU), and/or any other suitable functional circuit blocks of the microprocessor 110*a*. As described herein, the APRC 130 can mitigate power ramp and voltage droop issues in the microprocessor 110*a*, for example, by monitoring and controlling power fluctuations (e.g., voltage droop, dI/dt, etc.).

Many state-of-art microprocessors include multiple cores, which can provide distributed, parallel, and/or other processing functionality. In some such microprocessors, the latency to transmit signals throughout a power plane can take up to tens of nanoseconds. Controlling power ramp and voltage fluctuation can be very sensitive to timing. Accordingly, some implementations distribute multiple APRCs 130 across the microprocessor. For example, the microprocessor 110*b* shown in FIG. 1B includes four cores 115. Each core has its own set of functional units 120 and its own APRC 130. Each APRC 130 can analyze the power of its core 115 and can control the power and voltage fluctuations therein.

Figure 2:
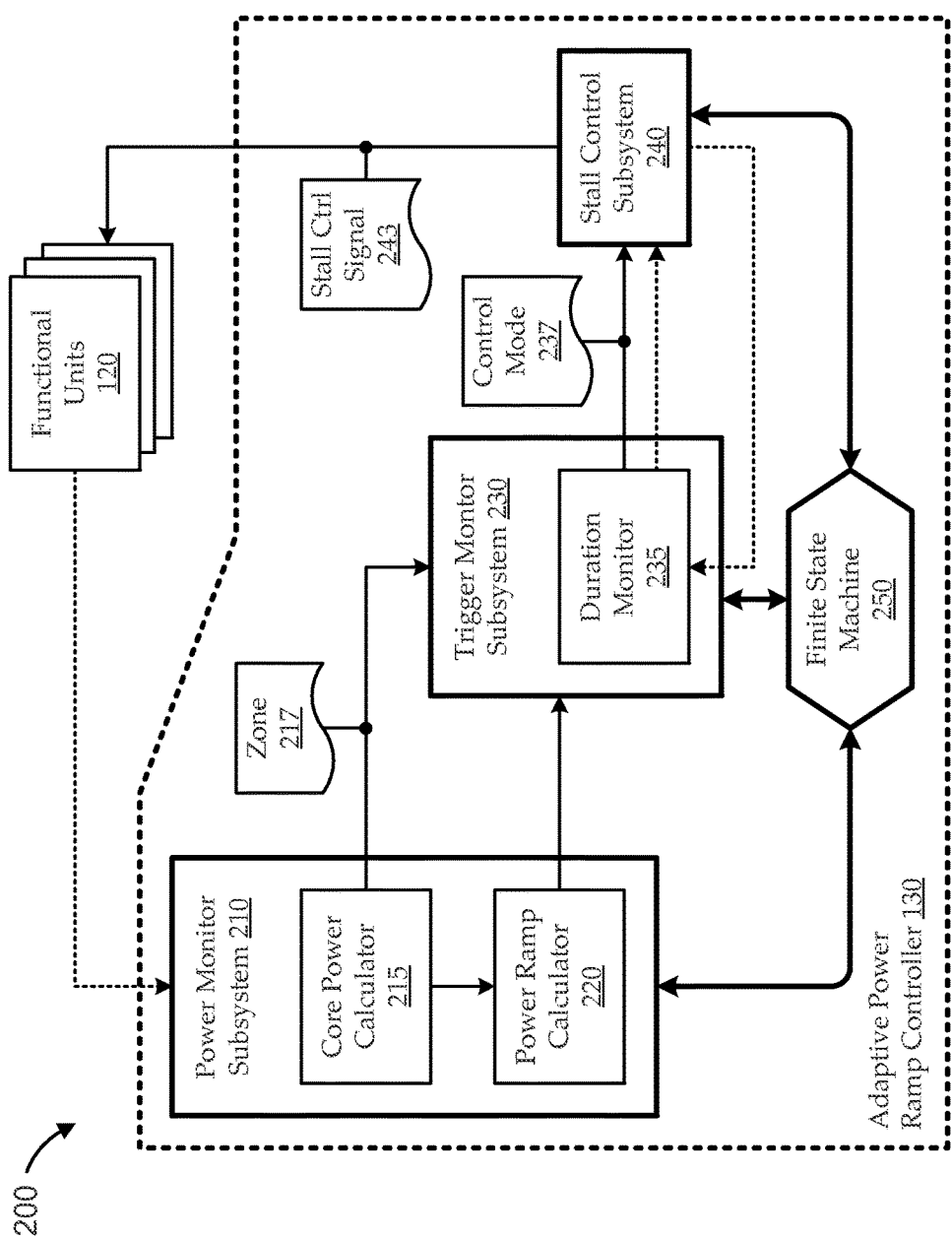
FIG. 2 shows a block diagram of an illustrative microprocessor that includes an illustrative adaptive power ramp controller in communication with functional units, according to various embodiments.

FIG. 2 shows a block diagram of an illustrative microprocessor 200 (or a core of a microprocessor) that includes an illustrative adaptive power ramp controller (APRC) 130 in communication with functional units 120, according to various embodiments. The APRC 130 includes a power monitor subsystem 210, a trigger monitor subsystem 230, and a stall control subsystem 240. These subsystems can mitigate power ramp and voltage droop issues in the microprocessor 110*a*, for example, by monitoring and controlling power fluctuations (e.g., voltage droop, dI/dt, etc.).

Embodiments of the power monitor subsystem 210 include a core power calculator 215 and a power ramp calculator 220. In some implementations, the power monitor subsystem 210 is designed to have single-cycle resolution and very low latency to help ensure that the correct decisions are made quickly enough. The core power calculator 215 can monitor the present power of the microprocessor in any suitable manner, for example, by monitoring the present power in some or all of the functional units 120. The present power can be the cycle instantaneous power (CIP) or any other suitable power measurement. The core power calculator 215 can then determine into which control zone 217 the present power falls. For example, as described more fully below, implementations include predefined control zones, each including a range of power levels. In general, implementations recognize that the likelihood of an imminent power ramp is relatively low when the present power is very low or very high (e.g., at a high present power, there is limited room for the power to ramp up, thereby limiting the likelihood of any appreciable power ramp or the resulting voltage droop); while the likelihood is appreciably higher when the present power is in a middle range. Various implementations can include any suitable number of control zones (though each additional control zone can add to the design overhead), and each control zone can be tuned, as appropriate, to yield desired APRC 130 functionality.

Embodiments of the power ramp calculator 220 can calculate a present power ramp. The power ramp calculator 220 can monitor changes in the present power over time, for example, by calculating and monitoring a moving average for the slope of a power curve. Different implementations can monitor a change in power level, a change in average power level, a change in power ramp slope, a change in average power ramp slope, and/or any other suitable information. For example, the power ramp calculator 220 can use any suitable technique for determining when the power in the microprocessor 200 is increasing at a faster rate than some predetermined (e.g., tuned) threshold.

Some implementations use a four-cycle moving average that calculates changes in cycle instantaneous power (CIP) over times (t). For example, CIP_mov_avg(t) can be calculated as $[CIP(t)+CIP(t-1)+CIP(t-2)+CIP(t-3)]/4$. Because of timing constraints, certain implementations use CIP_mov_avg(t−1) to compute whether the current power level is in a particular control zone 217 (e.g., "No Danger," "Danger," "Less Danger," etc.), but other moving average values (e.g., at t, t−2, etc.) could alternatively be used. CIP_mov_avg(t)−CIP_mov_avg(t−1) can be used to compute the power ramp slope at a current cycle t, and can be compared with the control zone thresholds (e.g., [CIP_mov_avg(t)−CIP_mov_avg(t0)]/(t−t0)). As described below, the current power level and current power ramp slope information can be used together to indicate the likelihood of a future power ramp, and can inform entry into an appropriate control mode 237.

The power monitor subsystem 210 can communicate relevant power determinations (e.g., monitored and/or calculated conditions) to the trigger monitor subsystem 230 (e.g., directly or via functionality of the FSM 250). For example, the power monitor subsystem 210 can communicate a present control zone 215 (e.g., as determined by the core power calculator 215) and a present power ramp slope (e.g., as determined by the power ramp calculator 220. The trigger monitor subsystem 230 can use these and/or other values to determine a present control mode 237. For example, as described more fully below, the trigger monitor subsystem 230 can determine that no control is needed (i.e., the likelihood of an imminent power ramp event is low) when the present control zone is a "no control" zone (e.g., at an appreciably high or low present power level), regardless of the present power ramp slope; while the trigger monitor subsystem 230 can determine that power ramp control is needed (i.e., the likelihood of an imminent power ramp event is relatively high) when the present control zone is a "control" zone (e.g., at a predetermined middle-range present power level), if the present power ramp slope is also above a predefined threshold for that control zone.

For example, each control zone can be considered as having a lower boundary ("zone_lower") and an upper boundary ("zone_upper"). The trigger monitor subsystem 230 can determine whether CIP_mov_avg(t−1) (or any other suitable power level determination) falls between zone_lower and zone_upper for the various control zones 217. For example, the trigger monitor subsystem 230 can determine if zone_lower≤CIP_mov_avg(t−1)<zone_upper. The trigger monitor subsystem 230 can further determine if the power ramp exceeds a threshold by computing: CIP_mov_avg(t)−CIP_mov_avg(t−1)>zone_threshold, where "zone_threshold" is a threshold slope level for that control zone 217. These determinations can together determine whether the trigger monitor subsystem 230 triggers a particular control mode 237.

The control mode 237 can be communicated from the trigger monitor subsystem 230 to the stall control subsystem 240 (e.g., directly or via functionality of the FSM 250). Embodiments of the stall control subsystem 240 can generate a stall control signal 243 according to the received control mode 237. For example, if the control mode 237 indicates that no control is needed, the stall control subsystem 240 can generate either no stall control signal 243 or a stall control signal 243 that does not impact operation of the functional units 120 of the microprocessor 200. On the other hand, if the control mode 237 indicates that control is needed, the stall control subsystem 240 can generate a stall control signal 243 that stalls operation of one or more functional units 120 of the microprocessor 200 in a defined manner. For example, as described more fully below, the stall control signal 243 can include a periodic, cycle-by-cycle pattern for stalling operation of an instruction fetch unit, an instruction issue unit, etc. The effective amount of stalling (e.g., 25 percent of the cycles, 75 percent of the cycles, etc.) can directly impact present power usage of those functional units 120, and, accordingly, of the microprocessor 200. The stall control signal 243 can be tuned in various implementations to directly combat increases in power ramp slope to a desired extent. For example, there can be a trade-off between responding more aggressively and reducing performance (e.g., in each stalled cycle, the affected functional units 120 are using less power, but they are also not performing their respective functions). In some implementations, the same functional units 120 are used by the APRC 130 for power monitoring and for stalling; while other implementations monitor power using a different subset of functional units 120 (or in other ways) than those used by the stalling functions.

Some implementations exit control modes 237 under certain conditions. For example, certain conditions can indicate that the likelihood of an imminent power ramp event has reduced to an acceptable level, and it is no longer desirable to control power (e.g., by stalling functional units 120). One such condition can involve a reduction in power ramp slope and/or present power level (e.g., [CIP_mov_avg(t)−CIP_mov_avg(t0)]/(t−t0)*zone_threshold, where the APRC 130 entered the control mode 237 at t0). For example, it can be desirable to leave a particular control mode 237 if the conditions for entering that particular control mode 237 are no longer present. Alternatively, different thresholds can be pre-established for entering and leaving particular control modes 237. For example, the APRC 130 can be tuned to more readily enter a control mode 237 than to leave a control mode 237. Another such condition for leaving a control mode 237 can involve being in the control mode 237 for longer than a predetermined duration. For example, it can be determined that, after remaining in a particular control mode 237 for some number of cycles, it can be assumed that the likelihood of an imminent power ramp event has reduced sufficiently to justify leaving the control mode 237. Accordingly, as illustrated, some implementations of the trigger monitor subsystem 230 can include a duration monitor 235 and/or other subsystems to force a change in the control mode 237, for example, even where other conditions for being in the control mode 237 are present.

Some implementations include a finite state machine (FSM) 250 that monitors the present state of the APRC 130 and can direct operation of some or all of the subsystems. For example, embodiments can perform various functions on a cycle-by-cycle basis. At each cycle (or every n cycles), the FSM 250 can direct the various subsystems to perform their respective functions. For example, at each cycle, the power monitor subsystem 210 determines present power level, control zone 217, power ramp slope, etc.; the trigger monitor subsystem 230 determines an appropriate control mode 237, accordingly; and the stall control subsystem 240 generates and outputs an appropriate stall control signal 243, accordingly.

The various functional subsystems and units described above can be performed by any suitable means. The means may include various hardware and/or software component(s) and/or module(s), including, but not limited to a circuit, an application specific integrated circuit (ASIC), or processor. The various illustrative logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. For example, the APRC 130 can be implemented as a circuit of a microprocessor, and its subsystems can be implemented as sub-circuits using any suitable components.

Figure 3:
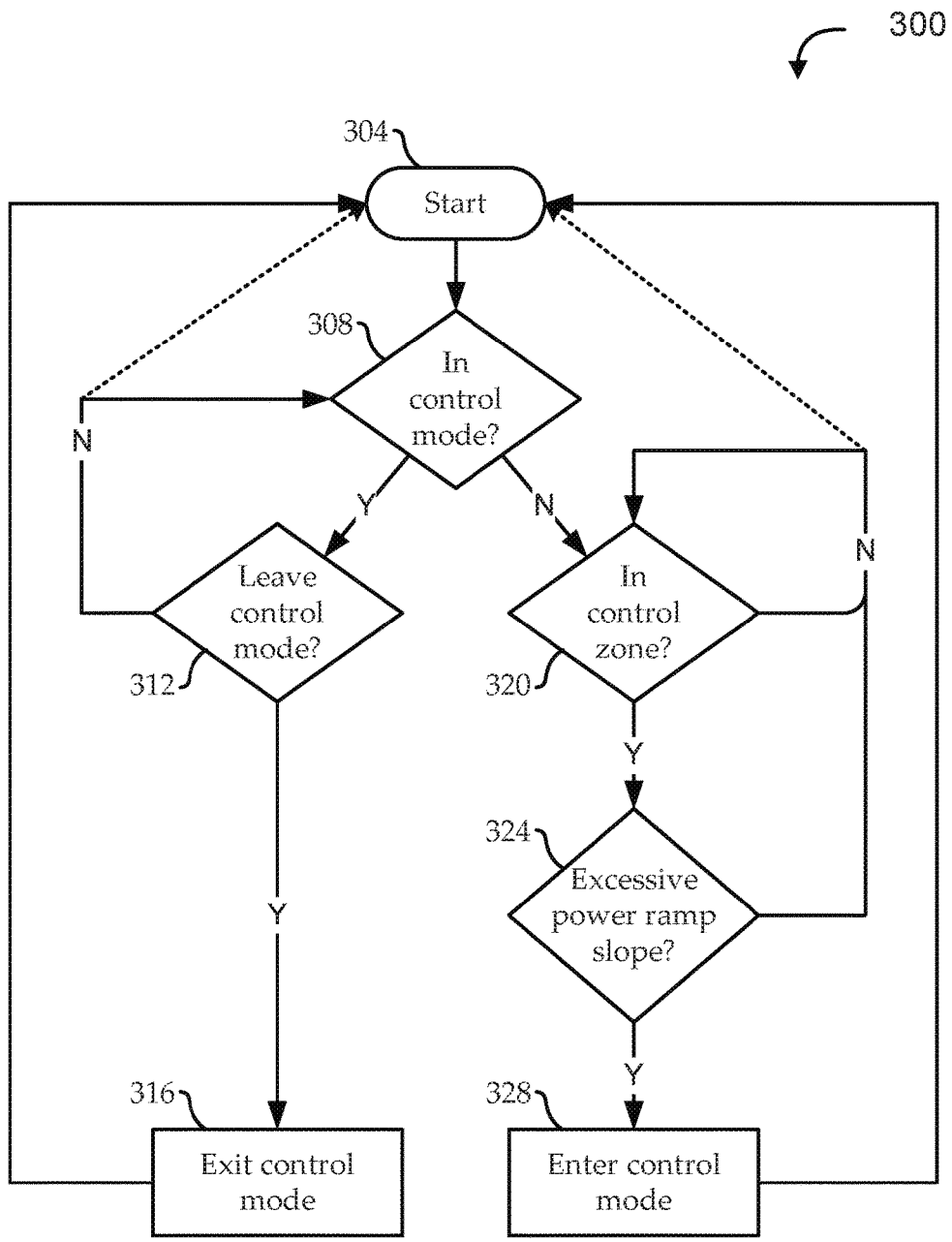
FIG. 3 shows a flow diagram of an illustrative method for adaptively controlling power ramp in a microprocessor, according to various embodiments.

Functionality of various embodiments, including the systems described above, are further described with reference to various methods below. FIG. 3 shows a flow diagram of an illustrative method 300 for adaptively controlling power ramp in a microprocessor, according to various embodiments. Embodiments operate in context of an illustrative APRC and each cycle of the method 300 can represent an operational cycle of the APRC. As illustrated, the method 300 can begin at stage 304, designated as "Start." At stage 308, a determination is made (e.g., by a FSM) as to whether the APRC is presently in a particular control mode. While some implementations can include a "No Control" mode, the description assumes for the sake of simplicity that being "in a control mode," or the like, refers to being in a mode in which core power is being controlled. For example, the determination at stage 308 may be negative if the present state is a "no control" mode (or simply not in a control mode), while the determination at stage 308 may be affirmative if the present state is a "danger" control mode, a "less danger" control mode, or the like, as described below.

If it is determined at stage 308 that the APRC is presently not in a control mode, one or more further determinations can be made as to whether the APRC should enter the control mode. As discussed above, some embodiments make this determination based on factors that indicate a high likelihood of an imminent power ramp event. At stage 320, a determination can be made as to whether the present core power is in a control zone. For example, if the present core power is within some predetermined middle range of power levels, there may be a relatively higher likelihood of a fast power ramp and a resulting voltage droop. If the present core power is not in a control zone, the method 300 can return to a suitable stage. For example, the method 300 can loop at stage 320 until it is determined that the present core power is in a control zone, or the method 300 can return to the start stage 304 to wait for the next operational cycle of the APRC.

Figure 4:
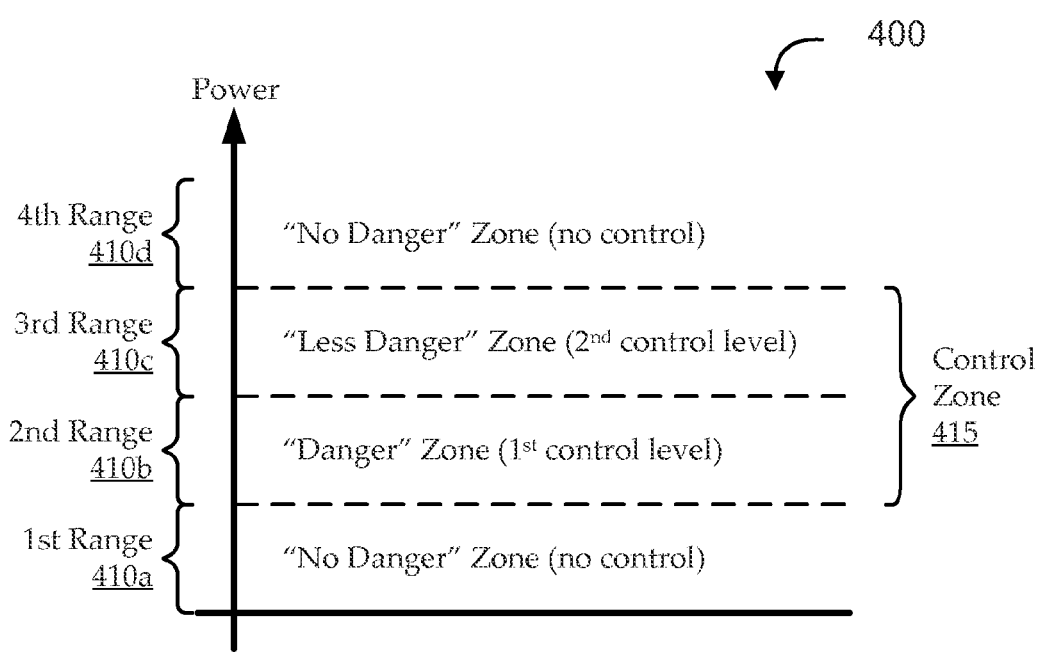
FIG. 4 shows an example graph of various control zones.

For the sake of illustration, FIG. 4 shows an example graph 400 of various control zones. As illustrated, a first range 410a of power levels can be designated as a "no danger" (or "no control") zone. For example, a present power level falling within this zone can be too low to cause concern from a power ramp perspective. A second range 410b of power levels can be designated as a "danger" zone. For example, this can be the range within which an undesirable power ramp event is most likely to occur. A third range 410c of power levels can be designated as a "less danger" zone. For example, in this range, an undesirable power ramp event is less likely to occur than in the "danger" zone, but more likely than in the "no danger" zone. A fourth range 410d of power levels can be designated as another "no danger" (or "no control") zone. For example, a present power level falling within this zone can be high enough, so that an undesirable power ramp event becomes sufficiently unlikely so as to be of no concern.

Various embodiments can include any suitable number of zones having any suitable power ranges 410. For example, some implementations do not distinguish between "danger" and "less danger" zones, and instead have a single control zone 415. Each zone and its respective range 410 can be tuned to manifest desired APRC functionality. For example, circuit simulations, actual circuit measurements, and/or other techniques can be used to tune the ranges 410 to appropriate (e.g., optimal) values. In some implementations, more than four control zones are provided for finer tuning of stall control responses. However, each additional zone can add overhead and complexity to the implementation.

Returning to FIG. 3, if it is determined at stage 320 that the present core power is in a control zone, a further determination can be made at stage 324 as to whether there is presently an undesirable power ramp condition. For example, implementations can determine if there is presently an excessive power ramp according to one or more tuned thresholds. If not, the method 300 can return to stage 320, return to the start stage 304 to wait for the next operational cycle of the APRC, or return to any suitable stage. If it is determined at stage 324 that there is presently an undesirable power ramp condition, embodiments of the method 300 can enter an appropriate control mode at stage 328. After entering the control mode at stage 328, the method 300 can return to stage 304, for example, to wait for the next operational cycle of the APRC.

Figure 5:
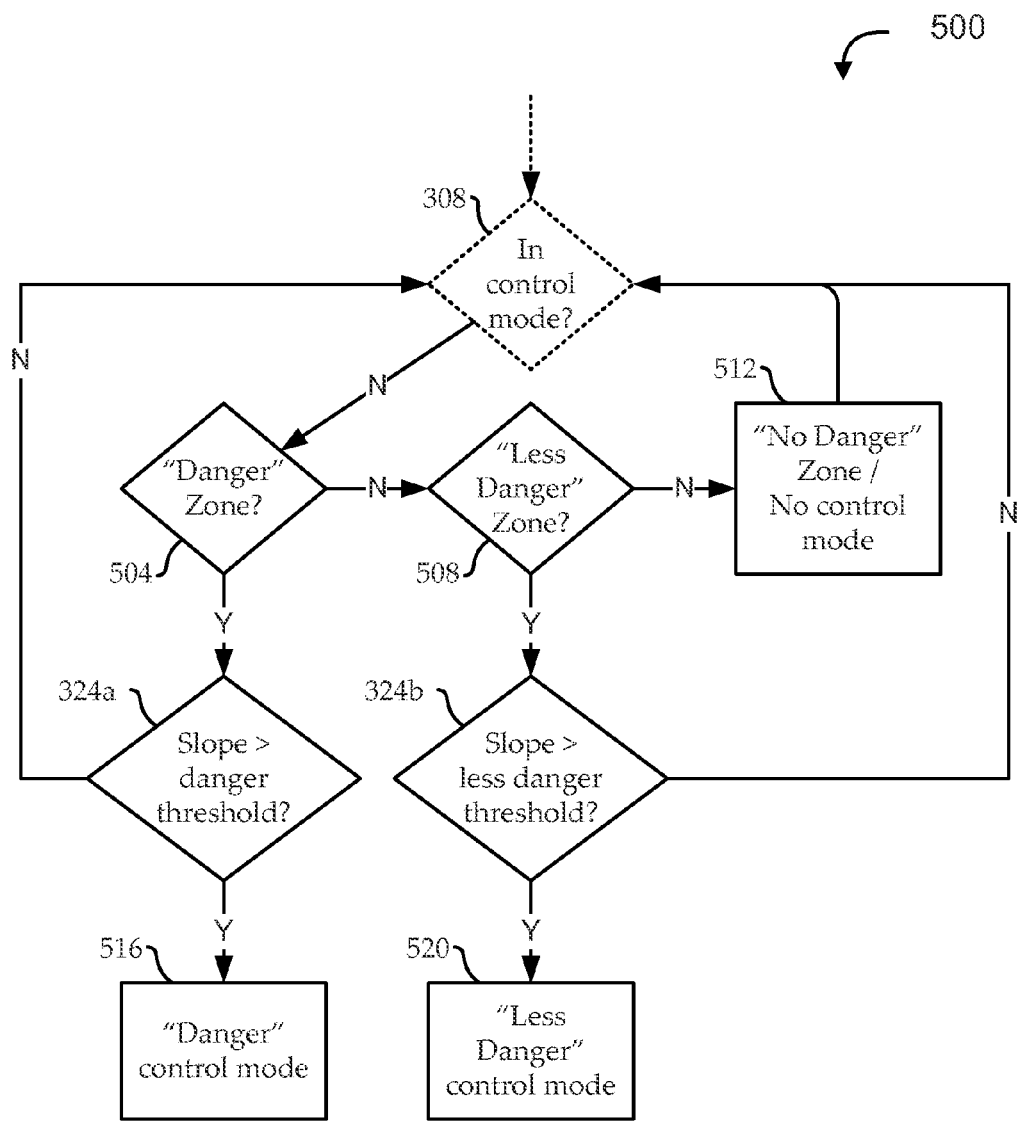
FIG. 5 shows a flow diagram of an illustrative method for determining into which control mode to enter, according to various embodiments.

For example, FIG. 5 shows a flow diagram of an illustrative method 500 for determining into which control mode to enter, according to various embodiments. The method 500 begins, for the sake of context, with a negative determination at stage 308 of FIG. 3. At stage 504, a determination can be made as to whether the present core power is in the "Danger" zone. If not, at stage 508, a determination can be made as to whether the present core power is in the "Less Danger" zone. If not, at stage 512, the present core power is determined to be in the "No Danger" zone, and the method 500 can return to any suitable stage. For example, as described above, each determination can involve measuring the core power and calculating into which range of power levels the present core power falls. Stages 504-512 provide a possible implementation with three or four zones, with the determinations made in one possible order. Other implementations can be tailored to different numbers of zones and/or determinations can be made in other orders and/or in parallel.

If it is determined at stage 504 that the present core power is in the "Danger" zone, a further determination can be made as to whether a present power ramp slope is greater than a predefined threshold at stage 324a (i.e., one illustrative implementation of stage 324 of FIG. 3). In some implementations, the determination of present power ramp slope involves a calculation of a present power ramp slope average over some number of cycles. For example, some implementations calculate the average power ramp slope over a fixed time window (e.g., the previous n cycles, where n is a fixed number); while other implementations calculate the average power ramp slope since the APRC last entered a control mode (or no control mode, as in the context of the method 500). The threshold can be specifically tuned for the "Danger" zone, or it can be the same threshold for all control zones. If the present power ramp slope is determined to be greater than the predefined threshold (e.g., or particular "Danger" zone threshold) at stage 324a, the method 500 can enter the "Danger" control mode at stage 516. Otherwise, the method 500 can return to any suitable stage (e.g., stage 308, stage 304, etc.).

If it is determined at stage 508 that the present core power is in the "Less Danger" zone, a further determination can be made as to whether a present power ramp slope is greater than a predefined threshold at stage 324b (i.e., another illustrative implementation of stage 324 of FIG. 3). The determination can typically be performed in the same manner as in stage 324a, but certain implementations can use different techniques for each determination. The threshold can be specifically tuned for the "Less Danger" zone, or it can be the same threshold for all control zones. For example, one implementation uses a higher threshold for average power ramp slope in the "Less Danger" zone than in the "Danger" zone to effectively reduce the sensitivity of the APRC to that zone. If the present power ramp slope is determined to be greater than the predefined threshold (e.g., or particular "Less Danger" zone threshold) at stage 324b, the method 500 can enter the "Less Danger" control mode at stage 520. Otherwise, the method 500 can return to any suitable stage (e.g., stage 308, stage 304, etc.).

Returning again to FIG. 3, if it is determined at stage 308 that the APRC is presently in a control mode, a further determination can be made at stage 312 as to whether the APRC should leave the control mode. Alternatively, a determination can be made as to whether the APRC should remain in the present control mode. If it is determined not to leave the present control mode (or to remain in the present control mode), the method 300 can return to stage 308 to determine (e.g., in the next cycle) whether the APRC is in a control mode. Alternatively, the method 300 can return to stage 304. If it is determined to leave the present control mode (or not to remain in the present control mode), the method 300 can exit the present control mode at stage 316. For example, exiting the control mode can involve removing all controls, reducing the level of control, etc. After exiting the control mode at stage 316, the method 300 can return to stage 304, for example, to wait for the next operational cycle.

Figure 6:
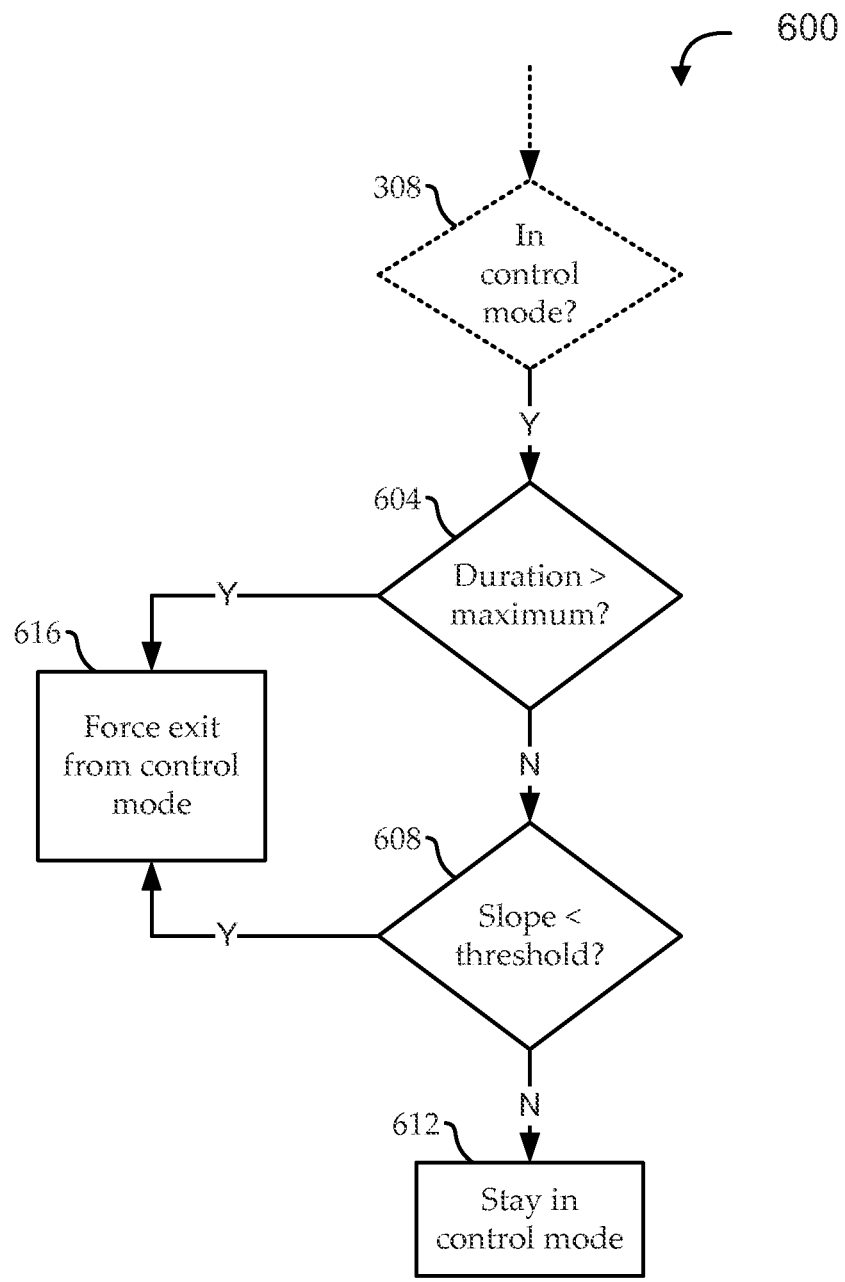
FIG. 6 shows a flow diagram of an illustrative method for determining whether to leave a control mode, according to various embodiments.

For example, FIG. 6 shows a flow diagram of an illustrative method 600 for determining whether to leave a control mode, according to various embodiments. The method 600 begins, for the sake of context, with a positive determination at stage 308 of FIG. 3, indicating that the APRC is presently in a control mode. At stage 604, a determination can be made as to whether the APRC has been in that control mode (or in some implementations, whether the APRC has been in any control mode) for longer than a predetermined duration. For example, each control mode can be associated with a predetermined (e.g., tuned) number of cycles. Alternatively, all control modes can have the same associated maximum duration. If the has been in the control mode for longer than the predetermined duration, embodiments can force an exit from the control mode at stage 616. In some implementations, the forced exit removes all controls (e.g., transitions from any present control mode to the "no danger," or "no control," mode. In other implementations, the forced exit transitions the APRC to a lower level of control. For example, the APRC can be forced to transition from the "Danger" control mode to the "Less Danger" control mode, or any other suitable transition.

If it is determined at stage 604 that the APRC has not been in that control mode for longer than the predetermined duration, a further determination can be made at stage 608 as to whether present slope conditions indicate that an imminent power ramp event is no longer likely. For example, a determination can be made of whether the present power ramp slope (e.g., power ramp slope average) is less than some predetermined threshold. The threshold can be the same as or different from the threshold used to determine whether to enter the control mode. The power ramp slope determination can involve a calculation of average power ramp slope over time. For example, some implementations calculate the average power ramp slope over a fixed time window (e.g., the previous n cycles, where n is a fixed number); while other implementations calculate the average power ramp slope since the APRC last entered the control mode. The threshold can be specifically tuned for each control mode, or it can be the same threshold for all control modes. If the present power ramp slope is determined to be less than the predefined threshold at stage 608, the method 600 can exit the control mode at stage 616. Otherwise, the method 600 can remain in the control mode at stage 612, and can return to any suitable stage (e.g., return to stage 304 of FIG. 3 to wait for the next APRC operational cycle, etc.).

Figure 7:
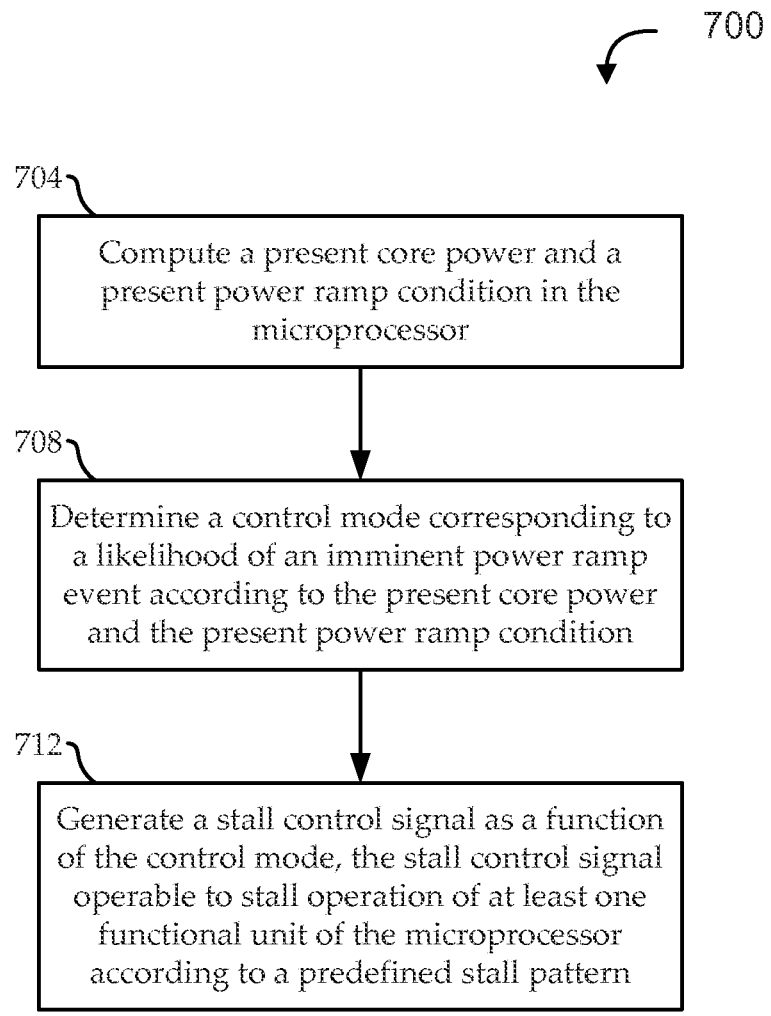
FIG. 7 shows a flow diagram of another illustrative method for adaptive power ramp control, according to various embodiments.

FIG. 7 shows a flow diagram of another illustrative method for adaptive power ramp control, according to various embodiments. The method can be implemented in an APRC of a microprocessor, or in any other suitable context. Embodiments of the method 700 begin at stage 704 by computing a present core power and a present power ramp condition in the microprocessor. As described above, the present power can be computed as a core instantaneous power and/or any other suitable measurement; and the power ramp condition can be computed as a power ramp slope, an average power ramp slope, and/or any other suitable measurement. At stage 708, embodiments can determine a control mode corresponding to a likelihood of an imminent power ramp event according to the present core power and the present power ramp condition. For example, as described above, the control modes can include "Danger" and "No Danger" modes, and/or any other suitable control modes (e.g., some implementations consider a "No Danger" control mode, while others consider that as not being in a control mode).

The determination to enter a control mode can effectively be a determination that there is a likelihood of an imminent, undesirable power ramp event. Accordingly, embodiments can respond by throttling back power usage of one or more functional units of the microprocessor. For example, embodiments can generate a stall control signal as a function of the control mode at stage 712. The stall control signal can stall operation of at least one functional unit of the microprocessor according to a predefined stall pattern.

Figure 8:
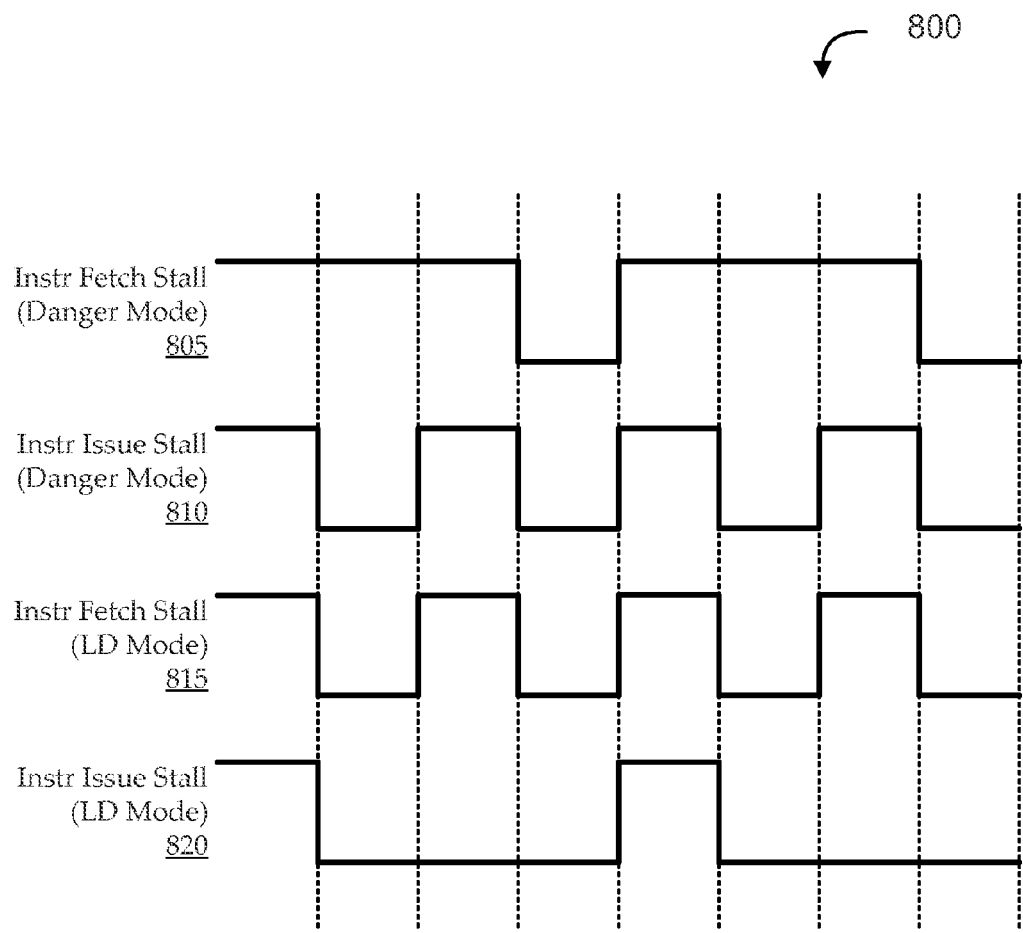
FIG. 8 shows various example stall control signals.

For the sake of illustration, FIG. 8 shows various example stall control signals 800. As illustrated, the example stall control signals can stall operation of an instruction fetch unit and an instruction issue unit in different ways, and the stall control signals can be different for different control modes. A first stall control signal 805 operates to stall the instruction fetch unit when the APRC is in the "Danger" control mode for three of every four cycles (i.e., 75 percent). A second stall control signal 810 operates to stall the instruction issue unit when the APRC is in the "Danger" control mode for two of every four cycles (i.e., 50 percent). A third stall control signal 815 operates to stall the instruction fetch unit when the APRC is in the "Less Danger" control mode for two of every four cycles (i.e., 50 percent). A fourth stall control signal 820 operates to stall the instruction issue unit when the APRC is in the "Less Danger" control mode for one of every four cycles (i.e., 25 percent). Other suitable stall control signals are used by other implementations. For example, stall control signals can be tuned to reduce power consumption enough to combat a power ramp event, while avoiding excessive reduction in performance of the affected functional units. Further, while the illustrated stall control signals are all periodic, cycle-by-cycle stall patterns for stalling operation of a particular functional unit, any suitable stall pattern (e.g., not periodic, not per-cycle, etc.) can be used.

The systems and methods described above provide a novel approach to dynamically adapting to power ramp conditions directly and rapidly enough to operate in context of high frequency fluctuations. Still, some other traditional approaches can be effective in other frequency ranges. Accordingly, some embodiments use a combined approach to respond to voltage fluctuations over a large range of frequencies.

Figure 9:
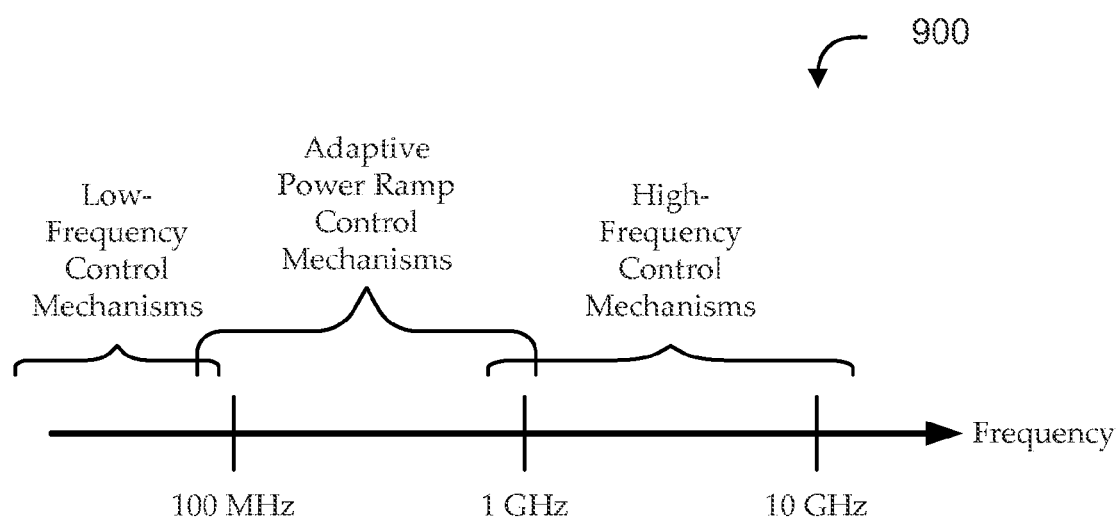
FIG. 9 shows one combined approach to handling voltage fluctuations, according to some embodiments.

FIG. 9 shows one combined approach 900 to handling voltage fluctuations, according to some embodiments. The illustrated approach combines three mechanisms, each tailored to address voltage fluctuations in different (though potentially overlapping) frequency bands. Power fluctuations occurring at frequencies of around 100 MHz to 1 GHz can tend to be effectively combated using the novel adaptive power ramp control approaches described herein. Lower frequency power fluctuations can tend to be effectively combated using lower frequency mechanisms, and higher frequency power fluctuations can tend to be effectively combated using higher frequency mechanisms. For example, some traditional lower frequency mechanisms can include a Frequency Lock Loops (FLL), a digital Phase Lock Loop (digital PLL) with a critical path monitor, a, on-board decoupling capacitor, etc. These approaches can typically react to voltage droops that have already occurred, such that they tend to be ineffective for very-high-frequency voltage droops (e.g., higher than around 100 MHz). Some traditional higher frequency mechanisms seek to directly decrease high-frequency voltage droops by tuning the impedance of a microprocessor's power distribution network (PDN), for example, by using an on-chip de-coupling capacitance. Some or all of these and/or other approaches can be used concurrently to respond to power fluctuations over a wide variety of frequencies.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The functions described may be implemented in hardware, software, firmware, or any combination thereof. If implemented in software, the functions may be stored as one or more instructions on a tangible computer-readable medium. A storage medium may be any available tangible medium that can be accessed by a computer. By way of example, and not limitation, such computer-readable media can comprise RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

A computer program product may perform certain operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A system for adaptive self-control of microprocessor power, the system comprising:
   a power monitor subsystem disposed to compute a present core power and a present power ramp condition in the microprocessor, the present core power falling within one of a plurality of predefined control zones, the plurality of predefined control zones comprising a no-danger zone having a first range of core power levels, and a danger zone having a second range of core power levels;
   a trigger monitor subsystem disposed to enter a control mode in response to detecting that the present core power falls within the danger zone and the present power ramp condition exceeds a threshold corresponding to a likelihood of an imminent power ramp event in the danger zone; and
   a stall control subsystem disposed to generate a stall control signal as a function of the control mode, the stall control signal operable to stall operation of at least one functional unit of the microprocessor according to a predefined stall pattern.

2. The system of claim 1, wherein the present core power is the cycle instantaneous power.

3. The system of claim 1, wherein the present power ramp condition is computed according to a present power ramp slope.

4. The system of claim 1, wherein the trigger monitor is disposed to determine the control mode by detecting a power ramp trigger according to which of the predefined control zones the present core power falls within.

5. The system of claim 1, wherein the trigger monitor is disposed to exit the control mode in response to detecting that the present core power has been within the danger zone for greater than a predefined duration.

6. The system of claim 1, wherein:
the no-danger zone is a first no-danger zone, the second range of core power levels is higher than those of the first range, and the plurality of predefined control zones further comprises a second no-danger zone having a third range of core power levels that is higher than those of the second range.

7. The system of claim 6, wherein the plurality of zones further comprises a less-danger zone having a fourth range of core power levels that is higher than those of the second range and lower than those of the third range.

8. The system of claim 7, wherein the stall controller is disposed to:
generate a first stall control signal to stall operation of the at least one functional unit of the microprocessor according to a first predefined stall pattern when the present core power is in the danger zone; and
generate a second stall control signal to stall operation of the at least one functional unit of the microprocessor according to a second predefined stall pattern when the present core power is in the less-danger zone, the second stall control signal being different from the first stall control signal.

9. The system of claim 1, wherein the predefined stall pattern indicates during which of a sequence of operational cycles of the microprocessor to stall operation of the at least one functional unit of the microprocessor.

10. The system of claim 1, wherein the stall control signal stalls operation of at least one of an instruction fetch functional unit or an instruction issue functional unit of the microprocessor according to at least one predefined stall pattern.

11. The system of claim 1, wherein the stall control signal stalls operation of an instruction fetch functional unit according to a first predefined stall pattern and of an instruction issue functional unit according to a second predefined stall pattern.

12. A method for adaptive self-control of microprocessor power, the method comprising:
computing a present core power in a microprocessor, such that the present core power falls within one of a plurality of predefined control zones, the plurality of predefined control zones comprising a no-danger zone having a first range of core power levels, and a danger zone having a second range of core power levels;
computing a present power ramp condition in the microprocessor;
determining to enter a control mode in response to detecting that the present core power falls within the danger zone and the present power ramp condition exceeds a threshold corresponding to a likelihood of an imminent power ramp event in the danger zone; and
generating a stall control signal as a function of the control mode, the stall control signal operable to stall operation of at least one functional unit of the microprocessor according to a predefined stall pattern.

13. The method of claim 12, wherein determining to enter the control mode comprises detecting a power ramp trigger according to whether the present core power is within the danger zone.

14. The method of claim 12, further comprising
determining to exit the control mode in response to detecting that the present core power has been within the danger zone for greater than a predefined duration.

15. The method of claim 12, wherein:
the no-danger zone is a first no-danger zone, the second range of core power levels is higher than those of the first range, and the plurality of predefined control zones further comprises a second no-danger zone having a third range of core power levels that is higher than those of the second range.

16. The method of claim 15, wherein the plurality of zones further comprises a less-danger zone having a fourth range of core power levels that is higher than those of the second range and lower than those of the third range.

17. The method of claim 16, wherein generating the stall control signal comprises:
generating a first stall control signal to stall operation of the at least one functional unit of the microprocessor according to a first predefined stall pattern when the present core power is in the danger zone; and
generating a second stall control signal to stall operation of the at least one functional unit of the microprocessor according to a second predefined stall pattern when the present core power is in the less-danger zone, the second stall control signal being different from the first stall control signal.

18. The method of claim 12, wherein the predefined stall pattern indicates during which of a sequence of operational cycles of the microprocessor to stall operation of the at least one functional unit of the microprocessor.

19. A microprocessor having adaptive power ramp control, the microprocessor comprising:
a plurality of functional units; and
an adaptive power ramp controller circuit in communication with at least some of the functional units and comprising:
a power monitor sub-circuit disposed to compute a present core power and a present power ramp condition in the microprocessor, the present core power falling within one of a plurality of predefined control zones, the plurality of predefined control zones comprising a no-danger zone having a first range of core power levels, and a danger zone having a second range of core power levels;
a trigger monitor sub-circuit disposed to enter a control mode in response to detecting that the present core power falls within the danger zone and the present power ramp condition exceeds a threshold corresponding to a likelihood of an imminent power ramp event in the danger zone;
a stall control sub-circuit disposed to generate a stall control signal as a function of the control mode, the stall control signal operable to stall operation of at least one functional unit of the microprocessor according to a predefined stall pattern; and a finite state machine sub-circuit disposed to monitor a present state of the microprocessor and to direct operation of the power monitor sub-circuit, the trigger monitor sub-circuit, and the stall control sub-circuit according to the detected present state of the microprocessor.

20. The microprocessor of claim 19, further comprising:
a plurality of cores, each comprising an instance of the plurality of functional units and an instance of the adaptive power ramp controller.

* * * * *